Aug. 24, 1965      F. J. ZAVASNIK      3,202,739
BLOW MOLDING ARTICLES HAVING BALANCED PROPERTIES
Filed Jan. 10, 1963
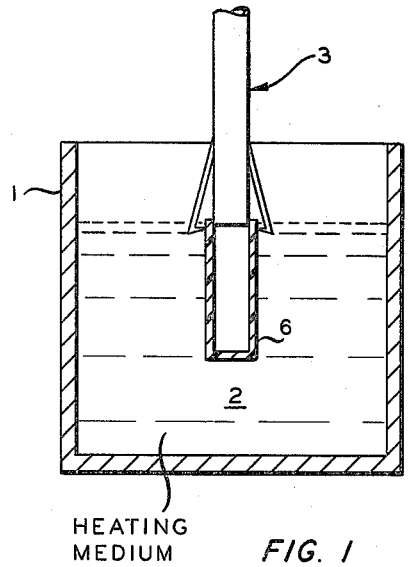
HEATING MEDIUM    FIG. 1
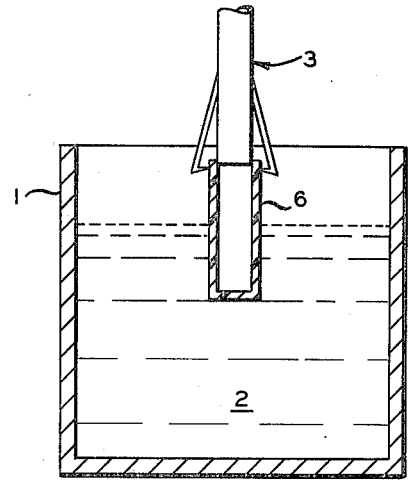
FIG. 2
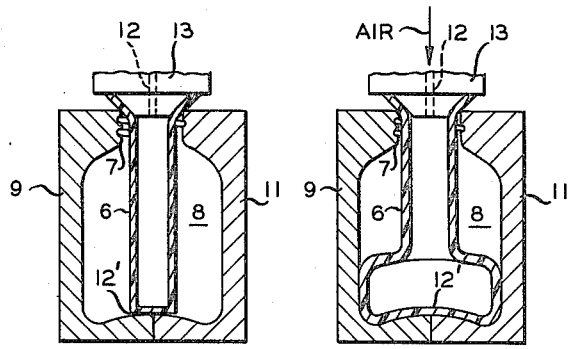
FIG. 3      FIG. 4
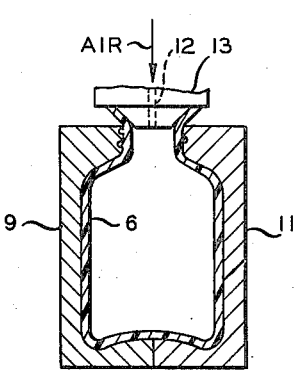
FIG. 5
INVENTOR.
F. J. ZAVASNIK
BY *Young & Quigg*
ATTORNEYS

United States Patent Office 3,202,739
Patented Aug. 24, 1965

3,202,739
BLOW MOLDING ARTICLES HAVING BALANCED PROPERTIES
Fredrick J. Zavasnik, Bartlesville, Okla., assignor to Phillips Petroleum Company, a corporation of Delaware
Filed Jan. 10, 1963, Ser. No. 250,527
2 Claims. (Cl. 264—98)

This invention relates to forming molded plastic articles by blow molding. In another aspect it relates to a method of fabricating a blown container having substantially uniform wall thickness and balanced strength properties.

The mechanical process known as blow molding by which hollow objects are produced by extending a quantity of moldable material into a hollow mold and then inflating said material against the mold surface where it freezes into a shape stable at normal atmospheric temperatures is a highly useful one in the plastic molding industry.

Prior art methods have often been plagued by nonuniform parison blowing, uneven wall thickness, and poor biaxial orientation of the formed article. One solution that has been offered to obtain wall uniformity when blowing a parison into a formed container is that the parison be axially stretched as the blowing pressure is introduced, also resulting in a biaxially oriented strengthened blown container. Unfortunately, adoption of this principle of operation of simultaneous axial expansion of the parison with the circumferential expansion produced by the introduction of blowing fluid necessitates the use of complex and relatively expensive molds. Annealing of conventionally blown bottles has also been resorted to in order to improve tensile modulus, but this also has its drawbacks.

Accordingly, it is an object of this invention to provide means for fabricating a blown container having substantially uniform wall thickness.

It is another object to provide a method for using conventional molds to produce a stiffer and stronger blown container resulting from good biaxial orientation.

It is still another object to provide a simplified and economical construction for a blown container having balanced properties.

Various modifications and aspects of the invention will become apparent to those skilled in the art without departing from the spirit and scope of this invention.

Broadly, the invention comprises conventionally extruding molten material in the form of a parison, heating the lower portion of said parison to a first and higher temperature; heating the upper portion of said parison to a second and lower temperature; then placing the resulting unevenly heated parison intermediate the opposing cavities of a mold, while centering the lower end of said parison therebetween; and expanding the centered parison by applying fluid under pressure to the interior thereof, to fill and freeze the parison into the opposing cavities of the mold, thereby providing a blown container having substantially uniform wall thickness and good biaxial orientation.

A temperature differential between the upper and lower portions of the thermally conditioned parison is necessary to the practice of this invention, which is generally in the range of 2 to 10° F.

In a preferred embodiment, the formed parison is immersed in a heated medium maintained at a temperature in the range of 220° F. to 340° F. for a controlled period of time in the range of 5 to 30 minutes; the heated parison is partially withdrawn from the medium, while leaving the lower end immersed for an additional but comparatively short period of time in the range of 10 to 30 seconds; then the thus unevenly heated parison is completely withdrawn from said medium, and subjected to blowing in a mold cavity as described above. Alternatively, radiant heaters can be used to heat the portions of the parison to dissimilar temperatures.

The fact that blown containers can be biaxially oriented without axial stretching is important, not only because of the simplification of the apparatus involved, but also because it reduces the mold thermal conditioning time required, by allowing the use of longer parisons having thinner walls for the production of a given container.

The process of the present invention is applicable to substantially all of the thermoplastic normally solid polymers and resins, such as the polyolefins, and especially polypropylene, ranging in density between 0.90 and 0.92 for articles of good durability. In general, any solid polymer of an aliphatic mono-1-olefin can be used within the scope of this invention. Examples of such starting materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide thermoplastic containers having particularly desirable properties, such as thermal insulation. Homopolymers and copolymers, as well as mixtures of homopolymers and copolymers are suitable polymeric materials for the articles of the invention. Other thermoplastics which are useful in the practice of this invention include polystyrene and polystyrene containing polymers, polyamides, fluorocarbon polymers, acrylic and acetal polymers.

A more complete understanding of the invention may be had by reference to the accompanying drawing, wherein like parts have been designated with like reference numerals, of which FIGURE 1 is a view, shown partially in section, of a parison positioned in a heating medium;

FIGURE 2 illustrates the parison partially withdrawn from the heating medium;

FIGURE 3 illustrates the heated parison positioned in a mold;

FIGURE 4 illustrates the initial expansion of the parison in the mold when blowing pressure is introduced; and FIGURE 5 illustrates the parison fully expanded into the mold.

Referring now to the drawing in detail and to FIGURE 1 in particular, there is shown a tank 1 which contains a heating medium 2. This heating medium can be ethylene glycol. A thermoplastic parison 6 which is closed at the lower end is submerged in the heating medium by means of a suitable clamp 3. The parison is so positioned for a preselected period of time, as previously described. The parison is then partially withdrawn from the heating medium, as illustrated in FIGURE 2. The parison is retained in the second position for a shorter period of time, as previously described.

The parison is then promptly removed from the heating bath and is inserted through an opening 7 into a cavity 8 which is formed by mold halves 9 and 11. The lower end 12′ of the parison centers on the bottom of the mold. This is illustrated in FIGURE 3. The parison is then expanded by applying fluid under pressure through a passage 12 formed in a blowhead 13. Upon application of blowing pressure, the outward movement of the parison is initiated at the hotter and lower end, which is also the point where maximum support for the seated parison is found. This support prevents excessive movement of the parison from its central axis, and causes uniform bubble initiation, as shown in FIGURE 4.

Once a uniform bubble is initiated, further bubble propagation is uniform, with the result being a blown container of substantially uniform wall thickness, as seen in FIGURE 5.

Initial tests were undertaken to determine operating conditions, uniformity of wall thickness and degree of strengthening of blown plastic containers by blowing of polyolefin parisons into a large diameter glass pipe.

EXAMPLE I

Pelleted commercial polypropylene was delivered to the hopper of a commercial extruder, wherein it was reduced to a molten state. The polymer was extruded as a tubing of 2⅞" O.D. with a 0.140" wall thickness. The tubing was severed in lengths of about 6 inches to form several parisons, one for the determination of parison average tensile yield point, and six more for blowing into bottles according to the method of this invention, under varying operating conditions.

Firstly, 8 specimens were cut from one of the cooled parisons, all 2" long x 0.25" wide in dimension. A conventional tensile tester was employed with a stretch rate of 20" per minute. The direction of the specimen cut, the measured thickness of each, the resulting elongation and tensile yield point for the 8 samples are given in Table I.

*Table I*

| Sample | Direction | Thickness, mils | Elongation, percent | Tensile yield (p.s.i.) |
|---|---|---|---|---|
| 1 | Machine | 140 | 20 | 3,915 |
| 2 | do | 140 | 24 | 3,700 |
| 3 | do | 145 | 290 | 4,335 |
| 4 | Radial | 140±.001 | 677.5 | 4,015 |
| 5 | do | 140±.001 | 420 | 3,815 |
| 6 | do | 140±{.001/.000} | 658 | 3,935 |
| 7 | Machine | 140 | 16½ | 3,800 |
| 8 | do | 143 | 232 | 4,140 |

Average tensile yield point for the 8 specimens was about 3960 p.s.i. All the parison specimens were observed to stretch by localized necking with a then unstable neck.

Six polypropylene parisons were each totally immersed in a heated treating bath containing triethylene glycol as heating medium maintained at 320° F. ±2° for about 15 minutes. The parisons were partially withdrawn with their lower half being subjected to an extra immersion period averaging 15 seconds. The blowing pressure was varied, as indicated in Table II for the several parisons. Most of the conditioned parisons blow uniformly as visually observed, and subsequently confirmed by measurement of thickness of six specimens taken from each blown sample. The operating conditions and observed results are set forth in Table II.

As to sample 4 the low initial blow pressure of 5 p.s.i. resulted in failure to blow. Immersion of parison in the bath for 5 additional minutes still resulted in failure to blow at 10 p.s.i. Reheating again and use of 25 p.s.i. finally resulted in blowing. It appears that for a given type of parison and conditioning temperature that the optimum blow pressure can easily be determined.

The average ultimate tensile point for all the specimens cut from the blown parison was 6700 p.s.i., for a strength increase obtained by blowing of 70 percent. Moreover, all the specimens stretched uniformly with a stable neck on the tensile puller.

Since the effective parison length was approximately 4½" and 3" of this length formed the top and bottom of the blown sample, 1½" of the tube was biaxially oriented. This became apparent when a 3" length circumferential strip was cut from the center of the blown sample, measured and tensile strengths obtained. The thickness obtained (approximately 25 mils) and the equal strengths in both directions could only be obtained by equal stretching of this portion of the parison (stretch ratio 2:1).

*Table II.—Oriented bottle blowing*

| Blown Sample No. | Tensile Specification No. | Initial tube, O.D. (in.) | Initial tube wall thickness (in.) | Bath temperature (° F.) | Time in bath (mins.) | Blow pressure (p.s.i.) | Final tube, O.D. (in.) |
|---|---|---|---|---|---|---|---|
| 1 | 1a | 2⅞ | .100 | 320 | ¹5 | 15 | 6 |
|   | 1b |   |   |   |   |   |   |
|   | 1c |   |   |   |   |   |   |
|   | 1d |   |   |   |   |   |   |
|   | 1e |   |   |   |   |   |   |
|   | 1f |   |   |   |   |   |   |
| 2 | 2a |   |   | 320 | ²5 | 10 | 6 |
|   | 2b |   |   |   |   |   |   |
|   | 2c |   |   |   |   |   |   |
|   | 2d |   |   |   |   |   |   |
|   | 2e |   |   |   |   |   |   |
|   | 2f |   |   |   |   |   |   |
| 3 | 3a |   |   | 320 | ³5 | ³5 | 6 |
|   | 3b |   |   |   |   |   |   |
|   | 3c |   |   |   |   |   |   |
|   | 3d |   |   |   |   |   |   |
|   | 3e |   |   |   |   |   |   |
|   | 3f |   |   |   |   |   |   |
| 4 | 4a |   |   | 315 | ⁴5 | 15 | 6 |
|   | 4b |   |   |   |   |   |   |
|   | 4c |   |   |   |   |   |   |
|   | 4d |   |   |   |   |   |   |
|   | 4e |   |   |   |   |   |   |
|   | 4f |   |   |   |   |   |   |
| 5 | 5a |   |   | 315 | ⁵5 | 20 | 6 |
|   | 5b |   |   |   |   |   |   |
|   | 5c |   |   |   |   |   |   |
|   | 5d |   |   |   |   |   |   |
|   | 5e |   |   |   |   |   |   |
|   | 5f |   |   |   |   |   |   |

See footnotes at end of table.

Table II—Continued

| Blown Sample No. | Tensile Specification No. | Direction of sample cut | Specimen width (in.) | Specimen thickness (in.) | Tensile strength, ultimate (p.s.i.) | Theoretical stretch based on thickness |
|---|---|---|---|---|---|---|
| 1 | 1a | Radial | 0.250 | 0.020 | 6,800 | 2.24 |
|   | 1b | Machine |   | 0.023 | 6,700 | 2.09 |
|   | 1c | Radial |   | 0.020 | 6,600 | 2.24 |
|   | 1d | Machine |   | 0.022 | 7,200 | 2.20 |
|   | 1e | Radial |   | 0.022 | 6,600 | 2.20 |
|   | 1f | Machine |   | 0.022 | 7,000 | 2.20 |
| 2 | 2a | Radial |   | 0.024 | 6,600 | 2.04 |
|   | 2b | Machine |   | 0.024 | 6,700 | 2.04 |
|   | 2c | Radial |   | 0.024 | 6,600 | 2.04 |
|   | 2d | Machine |   | 0.022 | 6,700 | 2.20 |
|   | 2e | Radial |   | 0.022 | 7,000 | 2.20 |
|   | 2f | Machine |   | 0.023 | 6,700 | 2.09 |
| 3 | 3a | Radial |   | 0.023 | 7,000 | 2.09 |
|   | 3b | Machine |   | 0.023 | 6,900 | 2.09 |
|   | 3c | Radial |   | 0.022 | 7,000 | 2.20 |
|   | 3d | Machine |   | 0.024 | 6,700 | 2.04 |
|   | 3e | Radial |   | 0.020 | 6,700 | 2.24 |
|   | 3f | Machine |   | 0.018 | 8,700 | 2.35 |
| 4 | 4a | Radial |   | 0.019 | 7,600 | 2.29 |
|   | 4b | Machine |   | 0.021 | 7,500 | 2.18 |
|   | 4c | Radial |   | 0.022 | 7,100 | 2.20 |
|   | 4d | Machine |   | 0.023 | 6,900 | 2.09 |
|   | 4e | Radial |   | 0.023 | 6,500 | 2.09 |
|   | 4f | Machine |   | 0.018 | 8,800 | 2.35 |
| 5 | 5a | Radial |   | 0.016 | 7,600 | 2.50 |
|   | 5b | Machine |   | 0.016 | 10,000 | 2.50 |
|   | 5c | Radial |   | 0.017 | 7,400 | 2.43 |
|   | 5d | Machine |   | 0.022 | 7,300 | 2.20 |
|   | 5e | Radial |   | 0.018 | 7,400 | 2.35 |
|   | 5f | Machine |   | 0.018 | 8,900 | 2.35 |

| Blown Sample No. | Tensile Specification No. | Percent elongation | Break | Comments—Tensile puller rate, 20 ins./min. |
|---|---|---|---|---|
| 1 | 1a | 187 | Yes | [1] 15 secs. extra immersion for bottom half of the tube. Sample blew uniformly. |
|   | 1b | 119 | Yes |   |
|   | 1c | 194 | Yes |   |
|   | 1d | 113 | Yes |   |
|   | 1e | 244 | Yes |   |
|   | 1f | 106 | Yes |   |
| 2 | 2a | 213 | Yes | [2] 15 secs. extra immersion for bottom half of the tube. |
|   | 2b | 69 | Yes |   |
|   | 2c | 220 | Yes |   |
|   | 2d | 88 | Yes |   |
|   | 2e | 238 | Yes |   |
|   | 2f | 170 | Yes |   |
| 3 | 3a | 225 | Yes | [3] 15 secs. extra immersion for bottom half of the tube. Tube did not blow. Reheated for another 5 mins. Did not blow with 10 p.s.i. pressure. Reheated again. Did not blow. Applied 25 p.s.i. pressure to blow. |
|   | 3b | 118 | Yes |   |
|   | 3c | 180 | Yes |   |
|   | 3d | 69 | Yes |   |
|   | 3e | 100 | Yes |   |
|   | 3f | 100 | Yes |   |
| 4 | 4a | 180 | Yes | [4] 15 secs. extra immersion for bottom half of the tube. |
|   | 4b | 125 | Yes |   |
|   | 4c | 219 | Yes |   |
|   | 4d | 100 | Yes |   |
|   | 4e | 194 | Yes |   |
|   | 4f | 88 | Yes |   |
| 5 | 5a | 194 | Yes | [5] 15 secs. extra immersion for bottom half of the tube. |
|   | 5b | 63 | Yes |   |
|   | 5c | 187 | Yes |   |
|   | 5d | 88 | Yes |   |
|   | 5e | 100 | Yes |   |
|   | 5f | 100 | Yes |   |

Reasonable variation and modification are possible within the scope of the foregoing disclosure, the drawings, and the appended claims to the invention.

I claim:

1. The method of fabricating a hollow container comprising:
   (a) immersing a hollow parison of thermoplastic resin of substantially uniform wall thickness and closed at one end into a liquid heated medium for a predetermined period of time;
   (b) partially withdrawing said parison from the medium so that the region of the parison adjacent the closed end thereof remains submerged, and retaining the parison in the thus partially withdrawn position for a second period of time shorter than the first mentioned period of time, the closed end being heated to a temperature 2 to 10° F. greater than the remainder of the parison;
   (c) completely withdrawing the parison from the medium and inserting the thus heated parison into a mold which is of larger cross section than the parison, the parison being inserted so that the closed end thereof engages the end of the mold; and
   (d) introducing fluid under pressure into the parison to expand same into engagement with the mold.

2. The method of claim 1 wherein the parison is formed of polypropylene, the temperature of the heating medium is in the range of 220 to 340° F., the first mentioned time is in the range of 5 to 30 minutes, and the second mentioned time is in the range of 10 to 30 seconds.

References Cited by the Examiner

UNITED STATES PATENTS 2,348,738   5/44   Hofmann _____ 18—55
2,750,625   6/56   Colombo _____ 18—55

OTHER REFERENCES

Pages 43 and 44; (1961); Blow Molding, Jones et al., Reinhold Publishing Corp., New York.

ROBERT F. WHITE, *Primary Examiner.*

MORRIS LIEBMAN, ALEXANDER BRODMERKEL, *Examiners.*